R. J. Morrison,
Harvester Cutter.
No. 16393
Patented Jan. 13. 1857.
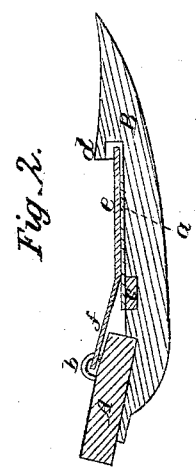
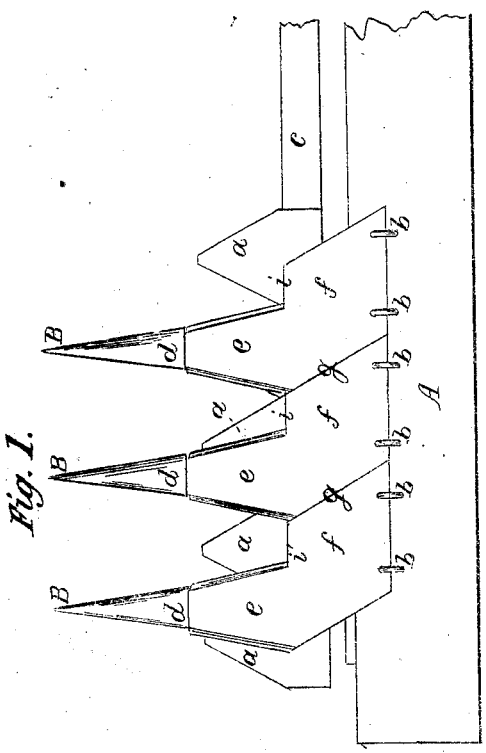

UNITED STATES PATENT OFFICE.

ROBERT J. MORRISON, OF RICHMOND, VIRGINIA.

IMPROVEMENT IN THE CUTTING APPARATUS OF HARVESTING-MACHINES.

Specification forming part of Letters Patent No. 16,393, dated January 13, 1857.

*To all whom it may concern:*

Be it known that I, ROBERT J. MORRISON, of Richmond, in the county of Henrico and State of Virginia, have invented certain new and useful Improvements in the Cutting Apparatus of Harvesting-Machines; and I do hereby declare the following to be a full, clear, and exact description of the same, reference being had to the accompanying drawings, making a part thereof, in which—

Figure 1 represents a top plan of a section of the cutting apparatus, and Fig. 2 represents a vertical section through the center of one of the fingers, and through the cutter-lid and finger-beam.

Similar letters, where they occur in the separate figures, denote like parts of the apparatus in both.

Letters Patent of the United States were granted to me on the 14th August, 1855, for hinging lids and allowing them to rest severally and independently upon the moving cutters for removing all accumulations on the cutters. This invention has proven itself valuable in practice, but the grass and gummy matter still found its way into the joints between the lids, and thus prevented their free action.

The object of my present invention is to still further avoid the clogging of the cutters by preventing the grass, &c., from interfering with the action of the lids, which are cleaners or clearers for the cutters; and my invention consists more particularly in making the rear or heels of the lids of rhomboidal form, or so that their joints shall stand oblique to the line at which the grain and grass is gathered in between the fingers to be cut.

To enable others skilled in the art to make and use my invention, I will proceed to describe the same with reference to the drawings.

A represents any ordinary finger or cutter beam, to the under side of which are secured the fingers B B, &c. The cutting-blades $a$ $a$ $a$, &c., are secured on the bar $c$, which bar slides through recesses formed in the fingers B, as seen in Fig. 2.

$e$ $e$ $e$ are the lids, hinged at the points $b$ $b$ $b$ to the finger-bar A. They extend forward and over the cutters or blades $a$ and rest upon said blades, and their points or foremost ends pass under the cap or top part, $d$, of the fingers to keep them from rising too far. Each lid, being separately hinged or hung, acts independently of the others, and is constantly cutting or scraping the blades as they pass underneath them, keeping them free from all accumulating matter. The base or rear $f$ of the lids is of a rhomboidal form, so as to give the joints $g$ a direction oblique to that of the line in which the grain or grass is gathered in and cut. The front line of the cutter-bar $c$ works flush with the sides $i$ $i$ of the rhombus, and consequently breaks the joints $g$ between the lids, and there checks the grass, &c., momentarily, or until the blades pass that point and sever it. The obliquity of the lines or joints $g$ prevents the grass from immediately entering said joints as it is gathered in between the fingers, and during its momentary check it is severed and drops away. By thus preventing the wire-grass, gum, or other matter from clogging the joints between the lids they are free to work over the blades and more effectually perform their function of clearing the cutters.

Having thus fully described the nature of my invention, what I claim therein as new, as an improvement on my patent of 14th August, 1855, and desire to secure by Letters Patent, is—

The peculiar form of the lid which overlies the cutters—viz., a lozenge or spear shaped point and rhomboidal base—for the purpose of giving an oblique direction to the joints between said lids to prevent the grass, gum, or other material from clogging said joint and checking the efficiency of the lids, substantially as herein described.

ROBT. J. MORRISON.

Witnesses:
  A. B. STOUGHTON,
  E. COHEN.